June 7, 1966 W. WITTE ETAL 3,254,545
DUAL-SPEED TRANSMISSION FOR A WASHING MACHINE
Filed Oct. 5, 1964

INVENTORS
Wolfgang Witte, Hans
Joachim Schwerdhöfer,
Josef Keller

United States Patent Office 3,254,545
Patented June 7, 1966

3,254,545
DUAL-SPEED TRANSMISSION FOR A WASHING MACHINE
Wolfgang Witte, Hans Joachim Schwerdhöfer, and Josef Keller, all of Schweinfurt (Main), Germany, assignors to Fichtel & Sachs A.G., Schweinfurt (Main), Germany, a corporation of Germany
Filed Oct. 5, 1964, Ser. No. 401,438
Claims priority, application Germany, Oct. 8, 1963, F 40,933
6 Claims. (Cl. 74—752)

This invention relates to dual-speed transmissions, and particularly to a transmission the transmission ratio of which is changed automatically in response to changes in input speed.

Dual-speed transmissions of the aforedescribed type are particularly useful in washing machines in which an agitator or the like is operated at relatively low speed during the laundering portion of the machine cycle whereas a much higher drive speed is needed during centrifugal extraction of the laundered goods. In such a machine, the dual-speed transmission is connected to the output shaft of a dual-speed electric motor which may be switched electrically from one to the other of its speeds, whereby the higher motor speed is transmitted to the operating elements of the washing machine at the higher speed ratio of the transmission, whereas the lower ratio of the transmission is automatically set when the drive motor is switched to its lower speed.

The primary object of the invention is the provision of a dual-speed transmission for washing machines and analogous applications which is simpler than the relatively complex automatic transmissions presently known for this purpose.

A concomitant object is the provision of an automatic dual-speed transmission which has relatively few and rugged moving parts and is therefore capable of being manuafctured at relatively low cost and is reliable in its operation.

An additional object is the provision of such a transmission which is very compact.

Other objects and many of the attendant advantages of this invention will be readily appreciated as the same becomes better understood by reference to the appended drawing which illustrates a preferred embodiment of the invention, and in which.

Figure 1:
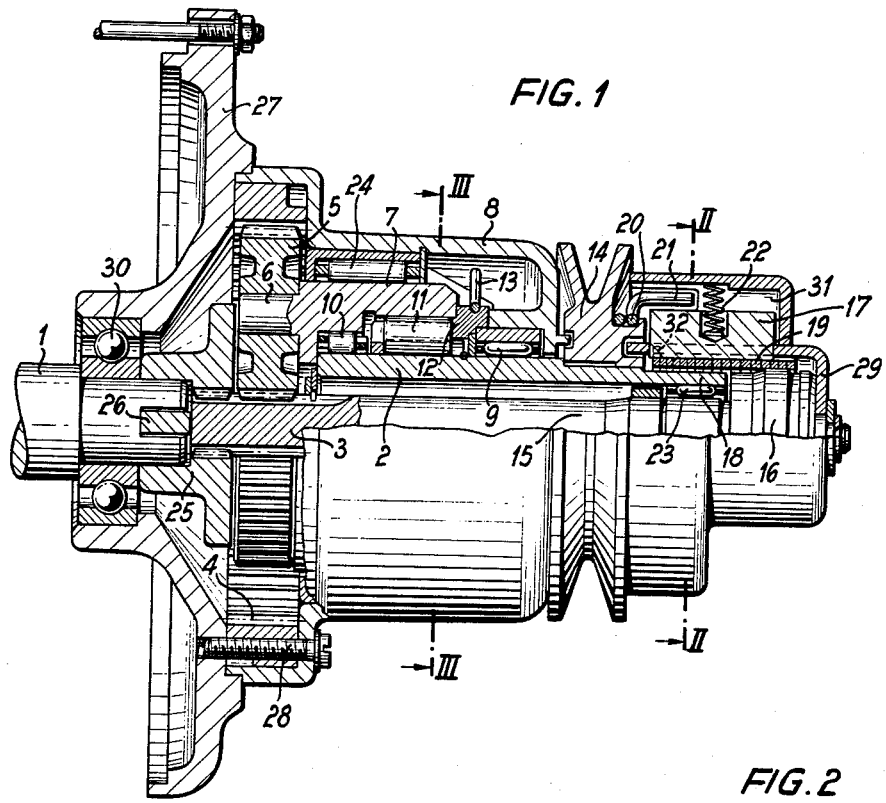
FIG. 1 shows a transmission of the invention and cooperating elements of an electric drive motor in elevational section through the common axis of the input and output shafts of the transmission.

Referring now to the drawing, and initially to FIG. 1, there is seen the output shaft 1 of an electric motor, not illustrated in detail, and the front wall 27 of the motor housing in which the shaft 1 is journaled by means of a ball bearing 30. The motor is of a known type which may be electrically switched to a lower and a higher output speed.

The dual-speed transmission with which this invention is more specifically concerned includes planetary gearing that is arranged in a transmission housing 8 attached to the front wall 27 of the motor housing by screws 28 of which only one is visible in the drawing. The transmission input shaft 15 one end portion of which fixedly carries the sun gear 3 of the planetary gearing connected to the output shaft 1 of the motor by a partly tubular coupling member 25 whose bore is grooved conformingly to receive the axially elongated teeth of the sun gear 3. A radial rib 26 of the coupling member 25 engages a conforming notch in the radial end face of the motor output shaft 1.

The central portion of the input shaft 15 is coaxially received in the tubular output shaft 2 of the transmission and is journaled in the output shaft by means of a needle bearing 23. The other axial end portion 16 of the input shaft projects from a corresponding axially terminal portion 18 of the output shaft 2 which extends outward of the transmission housing 8. The end portion 16 is radially enlarged so that its diameter is slightly greater than that of the terminal portion 18. The output shaft 2 is journaled in the transmission housing 8 by means of a needle bearing 9.

The planet carrier 7 of the planetary gearing is rotatably supported on the output shaft 2 by means of a roller bearing 10. Planet shafts 6 on the carrier 7 rotatably carry respective planet gears 5 which simultaneously mesh with the sun gear 3 and with an internally toothed ring gear 4 that is fixedly mounted on the housing 8 and centered on the common axis of the shafts 2 and 15. A needle bearing 24 is interposed between the planet carrier 7 and the transmission housing 8.

Figure 2:
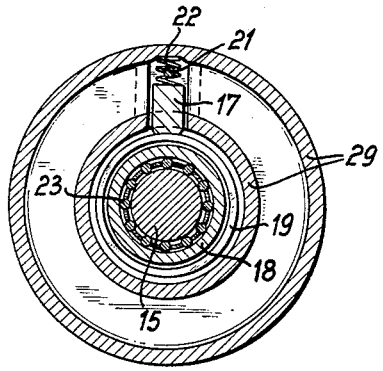
FIG. 2 shows the apparatus of FIG. 1 in radial section on the line II—II.
Figure 3:
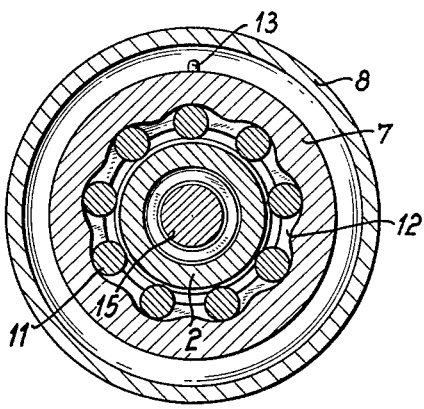
FIG. 3 is a radially sectional view of the apparatus of FIG. 1 taken on the line III—III.

Respective coaxial faces of the planet carrier 7 and of the output shaft 2 constitute the outer and inner races of an expanding friction roller clutch better seen in FIG. 3. The inner race of the clutch on the shaft 2 is smooth and cylindrical, and the outer race on the planet carrier 7 is axially grooved so as to be undulated in radial section. In the disengaged position of the clutch illustrated in FIG. 2, a cylindrical roller 11 is partly received in each of the nine uniformly spaced axial grooves of the outer clutch race. The rollers 11 are held in corresponding angularly spaced relationship by a cage 12.

Reverting now to FIG. 1, there is seen a spring 13 which frictionally engages the cage 12 and whose free end is attached to the housing 8. When the planet carrier 7 rotates while the output shaft 2 stands still or rotates at a lower speed, the rollers 11 are shifted by the cage 12 in a circumferential direction until they move from their associated grooves in the outer clutch race and are wedged between the planet carrier 7 and the output shaft 2, thereby transmitting torque from the carrier to the shaft. When the shaft 2 rotates at a higher speed than the planet carrier 7, the rollers 11 remain in their grooves and permit free rotation of the output shaft.

The portion of the output shaft outside the housing 8 carries a fixedly fastened V-belt pulley 14. The end portion 16 of the input shaft 15 fixedly carries a coupling spring 19 which is helical about the transmission axis and is axially partly coextensive with the terminal portion 18 of the output shaft 2. In the position illustrated in FIG. 1, the internal diameter of the spring 19 is slightly greater than the external diameter of the corresponding axial portion of the output shaft 2.

A generally cup-shaped clutch housing 29 is coaxially mounted on the free end portion 16 of the input shaft 15 and is freely rotatable on the shaft portion 16. A radially elongated guide pocket 31 of the actuator housing 29 encloses a centrifugal weight 17 which is freely movable in the pocket 31 between the illustrated inopertive position near the transmission axis and a position remote from the axis in which the weight abuts from the inside against the housing pocket 31. A helical compression spring 22 urges the weight 17 toward the inoperative position. The end 32 of the helical coupling spring 19 remote from the shaft portion 16 engages a radial slot in the centrifugal weight, thereby connecting the weight to the shaft 15 for joint rotation while not interfering with radial movement of the weight relative to the shaft. The clutch housing 29 is coupled to the shaft 15 by the guiding engagement of its pocket 31 with the weight 17.

The hub of the pulley 14 has an approximately cylindrical face which is frictionally engaged by two turns of a coaxial wire spring 20. The free straight end 21 of the wire spring 20 extends into the pocket 31 of the clutch housing in an axial direction at such a distance from the transmission axis as to be radially outside the path of the weight 17 when the latter is in the inoperative position thereof. When centrifugal forces acting on the weight 17 move the same radially outward from the illustrated position against the restraint of the spring 22, the weight 17 circumferentially abuts against the spring end 21 when the shafts 2 and 15 rotate at different speeds.

The aforedescribed apparatus operates as follows:

While the output shaft 1 of the electrical motor rotates at its lower speed, the suitably dimensioned spring 22 holds the centrifugal weight 17 in the inoperative position. The planet carrier 7 which rotates at a lower speed than the input shaft 15 is coupled to the output shaft 2 by the overriding clutch constituted by the rollers 11 and associated elements, and the pulley 14 rotates at the slow speed of the planet carrier 7 as is suitable for driving the agitator of the washing machine during laundering.

The coupling spring 19 is spaced from the terminal portion 18 of the output shaft 2 which rotates at slower speed than the spring. The relatively quickly rotating weight 17 is radially spaced from the more slowly rotating end portion 21 of the wire spring 20.

When the electric motor is switched to its higher speed, the weight 17 is rotated about the transmission axis by the shaft 15 and the spring 19 at sufficient speed to overcome the restraint of the spring 22 and to move into circumferential alignment with the spring end portion 21. The frictional drag of the spring 20 on the weight 17 upon abutting engagement of the latter with the end portion 21 causes the coupling spring 19 to be tightened about the terminal portion 18 of the output shaft 2. As soon as frictional contact between the spring 19 and the output shaft 2 is established, the coupling provided between the shafts 2, 15 by the spring 19 becomes self-tightening and no longer relies on the friction between the wire spring 20 and the hub of the pulley 14 alone.

The shaft 2 freely overrides the rollers 11, and the rollers, the planet carrier 7, and the planet gears 5 idle while the output shaft 2 is directly coupled to the input shaft 15.

It should be understood, of course, that the foregoing disclosure relates only to a preferred embodiment of the invention and that it is intended to cover all changes and modifications of the example of the invention herein chosen for the purpose of the disclosure which do not constitute departures from the spirit and scope of the invention set forth in the appended claims.

What is claimed is:

1. A two speed transmission responsive to driving speed for changing the transmission ratio thereof comprising, in combination:
    (a) a support;
    (b) a tubular output shaft journaled on said support for rotation about the axis thereof;
    (c) an input shaft coaxially rotatable in said tubular shaft, respective axial end portions of said input shaft axially projecting from the two corresponding axially terminal portions of said output shaft;
    (d) planetary gearing including
        (1) a sun gear fixedly mounted on one of said end portions of said input shaft,
        (2) a ring gear coaxial with said sun gear and fixedly fastened on said support,
        (3) a planet carrier rotatable on said support about said axis, and
        (4) a planet gear rotatable on said planet carrier in simultaneous meshing engagement with said sun gear and said ring gear;
    (e) overriding clutch means operatively interposed between said planet carrier and said output shaft for selectively transmitting torque from said planet carrier to said output shaft when the shaft rotates at a speed not higher than the rotary speed of the planet carrier;
    (f) releasable coupling means operatively interposed between the other end portion of said input shaft and the corresponding terminal portion of said output shaft, said coupling means being engageable for connecting said shafts for joint rotation about the common axis; and
    (g) centrifugal coupling actuating means, said actuating means including a centrifugal weight radially movable relative to said other end portion of said input shaft between two positions respectively adjacent and remote from said axis and connected to said other end portion for joint rotation about said axis, and motion transmitting means interposed between said centrifugal weight and said coupling means for engaging the same in response to radial movement of said centrifugal weight from said adjacent to said remote position thereof.

2. A transmission as set forth in claim 1, wherein said coupling means include a coupling spring substantially helical about said axis, one end portion of said spring being fastened to said other end portion, said spring spacedly enveloping the corresponding terminal portion of said output shaft when said coupling means is disengaged, the other end portion of said spring being secured to said centrifugal weight for connecting the same to said other end portion for joint rotation about said axis, and said coupling actuating means further including an abutment member yieldably mounted on said output shaft for rotation therewith, said abutment member extending into the path of said centrifugal weight when the same rotates relative to said output shaft while in said remote position thereof.

3. A transmission as set forth in claim 2, further comprising pulley means fastened on said corresponding portion of said output shaft, said abutment member being a spring frictionally engaging said pulley means.

4. A transmission as set forth in claim 2, wherein said support includes a housing enclosing said planetary gearing, said other end portion of said input shaft and the corresponding terminal portion of said output shaft projecting from said housing, and a guide casing rotatably mounted on said other end portion, said centrifugal weight being enclosed in said casing in engagement with the same for guiding said radial movement of the weight.

5. A transmission as set forth in claim 1, wherein said overriding clutch means includes an expanding friction roller clutch.

6. A transmission as set forth in claim 5, wherein said clutch includes an outer race integral with said planet carrier, an inner race integral with said output shaft, a plurality of rollers interposed between said races, and a cage holding said rollers in respective predetermined positions spaced about said axis.

References Cited by the Examiner

FOREIGN PATENTS 632,305  11/1949  Great Britain.

DAVID J. WILLIAMOWSKY, *Primary Examiner.*

T. C. PERRY, *Assistant Examiner.*